United States Patent [19]

Hawkins et al.

[11] 4,411,939
[45] Oct. 25, 1983

[54] CONFORMABLE REINFORCEMENT BOARD

[75] Inventors: Robert D. Hawkins; James A. Hawkins, both of Thrumpton, England

[73] Assignee: National Research Development Corporation, London, England

[21] Appl. No.: 210,794

[22] Filed: Nov. 26, 1980

[30] Foreign Application Priority Data

Nov. 28, 1979 [GB] United Kingdom ............... 7941054
May 31, 1980 [GB] United Kingdom ............... 8017867

[51] Int. Cl.³ .................... B32B 3/04; B32B 3/06
[52] U.S. Cl. .................................... 428/58; 156/93; 156/304.3; 428/71; 428/102; 428/177; 428/192; 428/218; 428/286; 428/308.4; 428/318.8
[58] Field of Search ............... 428/71, 76, 58, 102, 428/105, 192, 159, 160, 251, 286, 290, 285, 423.1, 318.8, 308.4, 177; 156/78, 79, 93, 304.3

[56] References Cited

U.S. PATENT DOCUMENTS

| | | | |
|---|---|---|---|
| 3,185,611 | 5/1965 | Rodmon et al. | 428/71 |
| 3,405,674 | 10/1968 | Cootes et al. | 428/102 |
| 3,544,417 | 12/1970 | Corzine | 428/117 |
| 3,709,733 | 1/1973 | Mautner | 161/37 |
| 3,801,420 | 4/1974 | Anderson | 428/160 |
| 4,291,851 | 9/1981 | Johnson | 428/378.8 |

FOREIGN PATENT DOCUMENTS 2338140 8/1977 France .
2396647 2/1979 France .

*Primary Examiner*—Paul J. Thibodeau
*Attorney, Agent, or Firm*—Cushman, Darby & Cushman

[57] ABSTRACT

A board which can be conformed to a desired shape, for example, when fabricating a curved wall of a boat hull or gas tank, consists of a plurality of core strips, preferably of polyurethane foam, with mating edge surfaces of complementary shape, with webs of fibrous material, for example, glass fibre matting, interposed between the mating edge surfaces and lying flat against the outer faces of the strips. The webs are held in contact with outer faces of the core strips, for example by stitching passing through outer cover sheets, also of glass fibre material. When "wetted out" with resin the board can be conformed to a desired shape by virtue of the mating edge surfaces of the core strips. The structure forms a rigid internally reinforced structure or wall when the resin is fully cured.

11 Claims, 4 Drawing Figures

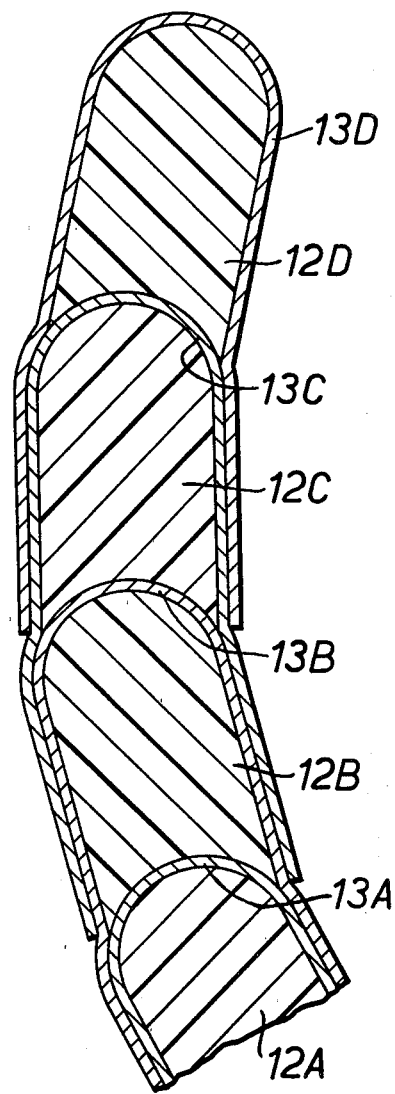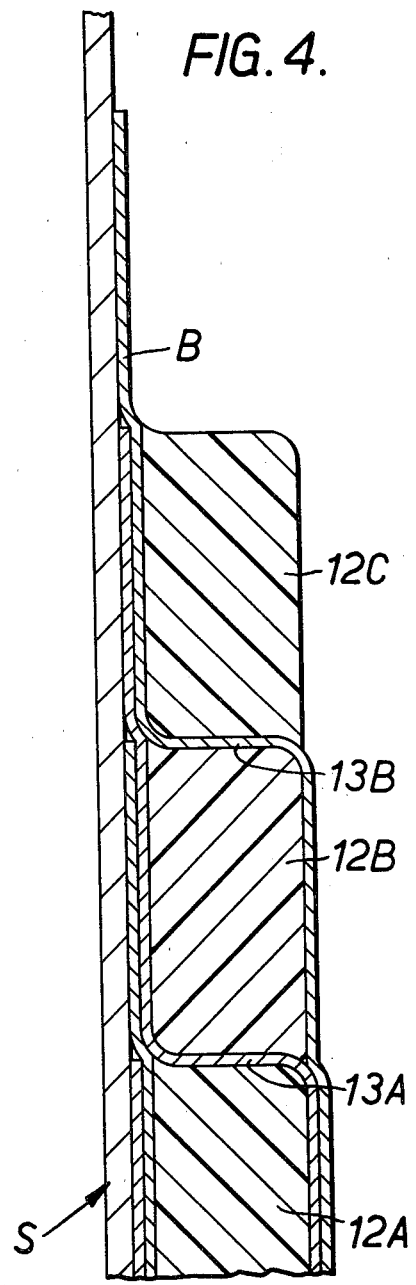

CONFORMABLE REINFORCEMENT BOARD

This invention relates to a reinforcement board for use in the fabrication of reinforced synthetic resin structures, particularly structures of glass fibre reinforced plastics (GRP), including walls, panels, shells and casings.

Glass fibre-synthetic resin laminates are used extensively in the construction of a wide range of products, including boats and vehicle bodywork. In some instances, for example when moulding boat superstructure or decks, it is necessary to introduce laminar reinforcements to ensure adequate strength and rigidity in the moulded structure. Such reinforcement commonly takes the form of lightweight materials sandwiched between layers of glass fibre which are impregnated with synthetic resin to build up a laminated structure of a desired thickness. The lightweight materials commonly used for the cores of such sandwich constructions are most commonly wood, for example, balsa wood, rigid plastics foam blocks, or plastics foam sheeting.

Low density polyurethane foam, although inherently cheaper than wood as a core material for such sandwich constructions, is expensive when produced in block or sheet form. The alternative use of balsa wood or plastics foam blocks as the core material, although giving good adhesion to the surface layers of glass fibre reinforced resin, can prove to be wasteful in he amount of resin required to fill up surface pores in the core material, which in turn tends to make the finished sandwich material heavier. Both balsa wood and plastics foam core materials have a tendency to fail by delamination and shear fracture, particularly when low density core materials, with a density less than 6 pounds per cubic foot, are employed.

An object of the present invention is to provide a lightweight reinforcement board which when wetted-out with synthetic resin and allowed to cure forms a rigid structure of high strength.

According to one aspect of the present invention there is provided a reinforcement board for use in reinforced synthetic resin constructions, comprising a plurality of core strips arranged in closely spaced side by side relation with facing edge surfaces of complementary shape, and webs of fibrous material interposed between the facing edge surfaces of the strips and lying flat against the outer faces of the board, the webs and core strips being held together into a unitary structure. Preferably, the facing edges of the core strips are curved to permit hingeing of adjacent strips.

When the board has been wetted-out with resin it is readily conformable to a mould surface, bending of the board being permitted by relative hingeing rotation of adjacent core strips. If flexibility is also required in a direction perpendicular to the core strips the strips themselves may be cut into short lengths, or scored or grooved at intervals.

The webs of fibrous material, which may consist of glass fibre material in the form of mat, roving or woven fabric, may lie flat against the two outer surfaces of at least one of the core strips. The webs covering adjacent core strips making up the board may overlap each other, so that each core strip is covered on each face by at least two layers of the web material, which then affords a rigid interconnection between adjacent core strips upon curing of the resin.

In an alternative embodiment of the invention, each web passing between two adjacent core strips lies flat against the two outer surfaces of one only of the core strips, so that each core strip has a single layer of the web material on each face. In this case the core strip may be rigidly interconnected by at least one continuous outer sheet of fibrous material which covers the webs on at least one face of the board and is retained against the core strips by the means for holding the webs in contact with the core strips. When the board is wetted-out with synthetic resin the outer sheet or sheets and the webs are impregnated and, upon curing of the resin, form, in effect, a rigid internally reinforced box structure. High strength combined with light weight can be ensured by selection of a suitable low density material for the core strips, for example low density urethane foam.

Because of the strength imparted to the cured structure by virtue of the resin-impregnated webs it is possible to use lightweight foam for the core strips, with a density as low as 2 pounds per cubic foot.

The assembled strips, webs and sheets may be held in place prior to wetting out with resin by any suitable fastening means such as, for example, stitching, staples or adhesive. Where adhesive is used it may be soluble in the resin used to wet-out the board, or may be an insoluble adhesive applied only to the sides of the webs which contact the faces of the core strips.

Satisfactory results can be obtained by tacking the webs to the core strips by means of discreet applications of insoluble adhesive at spaced apart positions. The adhesive will also serve to hold the outer sheet or sheets in place by permeating through the webs. Alternatively, the webs may be held in contact with the outer faces of the core strips by stitching passing through the core strips, the webs on opposite faces of the core strips and the or each outer sheet where present. The stitching may be arranged in parallel rows extending longitudinally of each core strip. Ordinary fibre thread can be used for the stitching since this will absorb resin when the board is wetted-out and will then add to the strength of the board upon curing.

It is also envisaged that the webs may be preassembled with the individual core strips, in which case the webs may be partially or fully wrapped around each strip. Where the core strips are of moulded plastics foam the fibrous webs may be wrapped around each strip before the foam is fully set, so that the foam enters the interstices of the web and binds the latter to the surface of the strip. For example, each form core strip could be moulded, or inserted after moulding, in a glass fibre tubular sleeve which constitutes the fibrous web covering the core strip.

Although core strips of lightweight synthetic resin, preferably polyurethane foam are preferred for their high strength-to-weight ratio, it may be found advantageous in practice to employ core strips of other lightweight materials, or to employ hollow core strips, for example of plastics or metal extruded tube.

In order to improve resin flow into the webs between the core strips, channels are preferably provided between the core strips in the form of transverse grooves in at least one of each pair of mating edge surfaces.

A further object of the present invention is to provide a method of fabricating a wall which does not require the use of elaborate formwork or moulds, and which results in a structure of high strength.

As applied to the construction of a wall the present invention provides in another aspect a method of fabricating a wall from superimposed blocks in which a bottom block course is covered by a first layer of fibrous material extending across an upper surface and attached to at least one face of the block course, a successive block course is covered by a further layer of fibrous material extending across an upper surface and overlapping the fibrous material attached to the said at least one face of the bottom block course.

By laying up successive courses of blocks, each covered with a layer of fibrous material which overlaps the tensile material on the course below, a wall structure is formed in which each course of blocks is effectively enclosed in a layer of fibrous material which serves to bind the course to the course immediately below it. The structure therefore has inherent rigidity and is moreover less prone to the problems arising from local separation of the tensile layers from the underlying blocks, since the resulting wall structure is in effect made up of a number of separately bonded tensile layers.

The first layer of fibrous material applied to the bottom block course may be attached to both faces of the block course, and the further layer of fibrous material overlaps the first layer on both said faces. In some cases it may not be practicable to bond each layer of fibrous material to both faces of the underlying layers. For example, the method of the invention may be used to erect a protective or decorative wall in front of an existing fixed wall with a vertical surface. In this case the first layer of fibrous material may be attached to a front face of the bottom block course and to the vertical surface above the bottom course, and the further layer of fibrous material may be superimposed on the first layer over said front face of the bottom block course and attached to the said vertical surface above the successive block course.

The fibrous material is preferably attached to the face or faces of the associated block course by adhesive bonding. Alternatively, the attachment may be carried out by nails, screws, rivets, pins or ties extending through or into the underlying block courses. Where the block courses are made up of foam material the fibrous layers may be attached by stitching through the layers and the underlying foam material.

The fibrous material may comprise glass fibre fabric impregnated with resin which constitutes the adhesive. Alternatively, the fibrous material may, for example, comprise a textile fabric impregnated with paint or size. Impregnation of the fabric may be effected before and-/or after application of the fabric layer to the block course. Thus in one useful application of the method of this invention, a wall may be erected in a flat form with the fabric layers held temporarily in place by means of soluble glue or sizing to enable the resulting wall panel to be handled easily. When the wall is erected and installed the fabric layers are "wet out" with resin or adhesive which softens the temporary glue or sizing, allowing the wall panel to be shaped to a desired form before the resin hardens fully to form a rigid structure.

The invention also comprehends a wall panel or like structure comprising at least two courses of blocks or elongate members with layers of fibrous material interposed between successive courses, the material of each layer being bonded to at least one face of the course below, and the layers between successive courses being superimposed on said face or faces. The blocks or elongate members used in the fabrication of the wall preferably consist of plastics foam material or wood.

The invention will be further described, by way of example only, with reference to the accompanying purely diagrammatic drawings, in which:

FIG. 3 is a vertical cross-sectional view of part of a wall according to another embodiment of the invention, and FIG. 4 is a vertical cross-sectional view of a wall according to the present invention in the course of construction.

Figure 1:
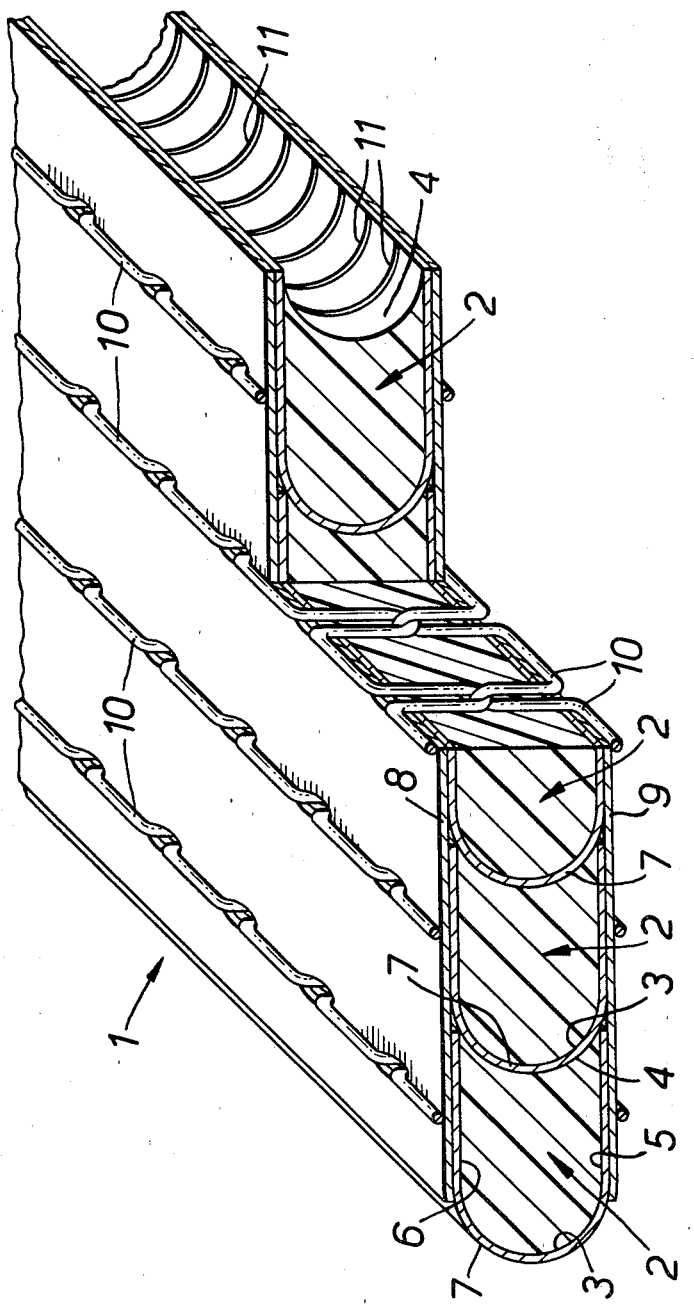
FIG. 1 is a partly cut-away perspective view of part of a conformable reinforcement board according to one embodiment of the invention.

Referring to FIG. 1, a section of conformable reinforcement board 1 is shown, prior to the wetting-out of the board with synthetic resin and the lamination of the board with layers of glass fibre reinforced plastics (GRP).

The reinforcement board 1 comprises a plurality of identical core strips 2 arranged side by side with mating edge surfaces of complementary shape. In the illustrated example, each core strip 2 has a rounded longitudinal edge surface 3 of convex cross section and an opposite rounded longitudinal edge surface 4 of concave cross section complementary to the convex edge surface 3. Each strip 2 has parallel flat lateral faces 5, 6 which interconnect the opposite longitudinal edge surfaces 3, 4.

Adjacent core strips 2 are separated by webs 7 of fibrous material in the form of glass fibre matting, roving or woven fabric. Each web 7 is interleaved between the mating edge surfaces 3, 4 of adjacent core strips 2 and lies flat against the outer lateral faces 5, 6 adjoining the convex edge surface 3 over which the web 7 passes. As depicted in the drawing, each web 7 covers the two lateral faces 5, 6 and the convex edge surface 3 of one of the core strips 2. Each web 7 may in practice cover only part of each lateral face 5, 6, or alternatively may extend beyond the core strip 2 to the neighbouring core strip or strips, overlapping the webs on the faces 5, 6 of the latter. An advantage of the arrangement illustrated is that free relative hingeing rotation between adjacent core strips 2 is permitted by virtue of the mating edge surfaces 3, 4, enabling the board 1 to be conformed to a mould surface by bending, both before and after wetting-out of the board with synthetic resin.

The individual web-covered core strips 2 are interconnected by outer continuous sheets 8, 9 of fibrous material which cover the webs 7 on the lateral faces 5, 6 of the core strips 2. The outer sheets, 8, 9 may, like the webs 7, be formed of glass fibre material in the form of matting or roving, but preferably in the form of woven fabric.

The assembled reinforcement board 1 in its dry state is held together by parallel rows of stitching 10 extending parallel to the core strips 2, each row of stitching 10 passing through the outer sheets 8, 9, one of the core strips 2, and the web 7 on opposite lateral faces 5, 6 of this core strip to hold the web 7 and the outer sheets 8, 9 flat against the lateral faces 5, 6 of the core strips. Synthetic fibre thread may be used for the stitching 10: such thread will absorb resin when the board is wetted-out, to add to the strength of the assembly. It will be noted that by arranging the rows of stitching 10 parallel to the longitudinal direction of the core strips 2 the flexing of the board 1 by relative hingeing rotation between adjacent core strips 2 is unimpeded, since such flexing will be accompanied by sliding of the glass fibre material constituting the outer sheets 8, 9 beneath the thread loops of the rows of stitching 10.

In the illustrated embodiment of the rows of stitching 10 comprise lock-stitches. Other forms of stitching, including chain-stitching, could, however, be employed.

The core strips 2 comprise rigid low density polyurethane foam, preferably moulded to the required shape so that each strip 2 has a surface "skin" of higher density than the remainder of the strip, thereby enabling a low density foam to be employed without wastage of resin due to excessive absorption through the surfaces of the strip 2. Ideally, the production of the foam core strips 2 is controlled so that each strip has a surface roughness and porosity sufficient to enable the laminating resin, commonly polyester resin, to form a key with the surfaces of the strip.

When the composite board 1 has been thoroughly wetted-out with polyester resin the webs 7 and the outer sheets 8, 9 become impregnated with resin and the board is then readily conformable to a mould surface. Once the resin has cured, however, the resulting boxed structure will have high strength and rigidity.

To encourage the flow of resin into the webs 7 interleaved between the mating edge surfaces 3, 4 of adjacent core strips one or both of the mating edge surfaces 3, 4 may be provided with transverse flow channels, formed in this example by grooves 11 in the concave edge surface 4.

For some practical purposes the board 1 may be provided with an outer sheet 8, 9 on one face only. The assembled board than becomes highly flexible and drapable in a manner similar to known composite block core reinforcement. The provision of an outer sheet 8, 9 on both faces is preferred, however since the two sheets 8, 9 serve to hold the core strips 2 tightly together in mating engagement, regardless of the relative hinging movement between adjacent core strips 2.

The illustrated reinforcement board may be used in the reinforcement of glass fibre laminated structures or as an insulating ining for existing structures. The method of use of the reinforcement board would be to apply the board to laminated glass fibre reinforced plastics (GRP) while it is still in its mould, and ideally before the synthetic resin is fully cured. A section of the reinforcement board would be cut to length, using a knife or scissors, and then thoroughly wetted-out with resin on one face. The wetted face of the board is then pressed onto the surface of the moulded laminate to be reinforced, and the exposed face of the reinforcement board is then wetted-out with resin using a brush or roller. Additional glass fibre material may be added at this stage to give additional strength as required.

Apart from the use of the illustrated board for the reinforcement of glass fibre laminated structures, the board can also be used by itself to form an internally reinforced self-supporting structure or an insulating cladding. Thus the board may be bent while in a dry state into a desired shape, for example, to form a curved wall of a gas tank or container. The board may be held in the required shape using a temporary framework. The board is then wetted-out with synthetic resin on both sides and the framework removed after the resin has hardened.

Figure 2:
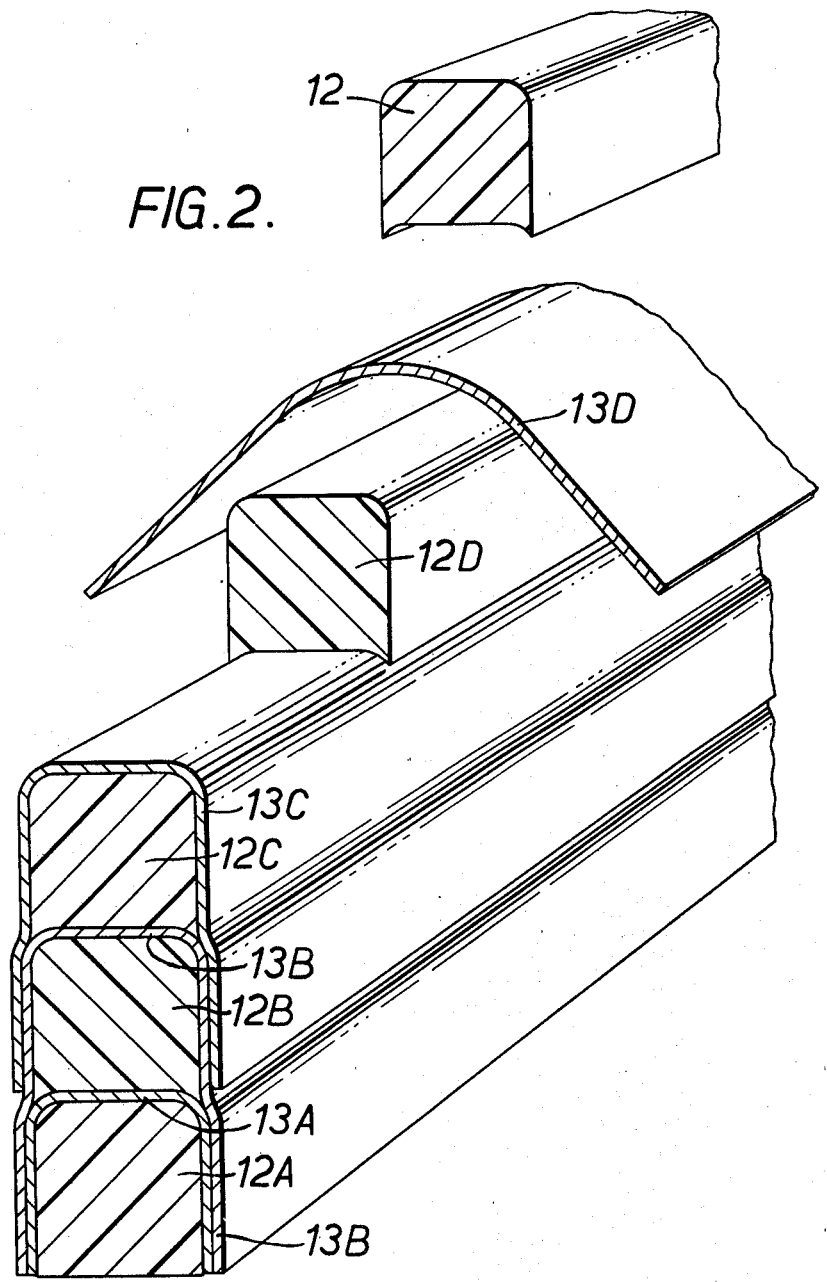
FIG. 2 is a partly sectioned perspective view illustrating the fabrication of a wall by a method according to the present invention.

FIG. 2 illustrates the construction of a wall 12 according to another aspect of the invention. The wall 12 is made up of superimposed courses of elongate core members 12A, 12B, 12C, 12D . . . , which may be in the form of blocks of plastics foam or honeycomb material, or beams or planks of, for example, wood.

After the bottom course 12A of blocks has been laid it is covered by a first layer 13A of tensile material such as, for example, glass fibre fabric impregnated with resin. The fabric layer 13A is drawn over the upper surface of the bottom course 12A, which is conveniently rounded at its corners, as illustrated, and the tensile material is attached to the opposite faces of the blocks forming the bottom course 12A, in this case by adhesive bonding. The tensile material is pressed down onto the upper surface of the block course 12A while being adhesively bonded to the upper surface and to the opposite faces of the course. For example, adhesive may be brushed into the fabric forming the tensile layer on the opposite faces of the block course 12A, the brushing being effective downwardly to tension the layer 13A. After the layer 13A has been applied the next successive course 12B of blocks is placed in position on the upper surface of the bottom course, sandwiching the layer of tensile material 13A between the two courses. The bottom surface of the second course of blocks 12B and successive courses is suitably profiled, as shown clearly in the case of the courses 12D and 12E, so that it fits snugly over the layer of tensile material 13A on the bottom course 12A. A second layer 13B of the same tensile material of that forming the layer 13A is then applied to the second course 12B, the second layer 13B passing over the upper surface of the second course of blocks 12B and being bonded adhesively to the outer faces of the blocks of the second course 12B. The tensile layer 13B has a length sufficient to cover, in addition, the outer faces of the bottom courses 12A of blocks, the layer 13B being bonded to the first layer 13A already attached to the outer faces of the bottom course 12A, as shown in FIG. 2.

A third course 12C of blocks is next superimposed upon the second course 12B, with the interposed second layer 13B, and subsequent courses 12D, 12E are then built up with interposed layers of overlapping tensile material 13C, 13D, as shown in FIG. 2. The resulting wall structure will consist of superimposed courses of rigid, and preferably light-weight, core material, each effectively enclosed in a casing of tensile material bonded to the core material and imparting tensile strength and rigidity to the resulting wall. The wall will have a single layer of tensile material between each successive course of core members and a double layer on each of its external faces. The external surfaces of the finished wall will thus be entirely clad in tensile material, the successive layers of which will be substantially flush with each other, as shown in FIG. 2. The external surfaces of the resulting wall will therefore have a smooth finish capable of receiving a decorative finish or surface layer as desired. The method of construction illustrated in FIG. 2 enables a strong wall to be constructed without the use of mortar, and without employing special skills. Moreover, the wall can be erected without employing specially shaped moulds or formwork.

For certain constructions it may be desirable to form the courses of core members with complementary ends of semi-circular cross-section, as illustrated in FIG. 3. This permits freedom of relative rotation when the successive courses 12A, 12B, 12C and 12D . . . are superimposed upon each other with the interposed layers 13A, 13B, 13C and 13D of tensile material. The resulting structure can be curved into a desired shape, as illustrated, before the adhesive impregnating the tensile layers fully cures. The wall structure can be held temporarily in the desired shape until the resin cures by the insertion of pins through the assembled courses.

The wall may alternatively be erected according to a desired curved shape by employing a soluble glue or size to form a temporary bond between the respective layers 13A, 13B and the associated courses 12A, 12B, and then the external surfaces of the wall may be "wet out" with a resin which softens the glue or sizing allowing the wall to be shaped as desired, and then hardens fully to form a rigid wall structure.

When erecting a wall against an existing vertical wall or other surface it will not in general be practicable to pass the tensile layers downwardly over the rear face of each course of blocks which faces towards the existing wall surface. In this case the method of applying the tensile layers may be reversed: that is to say, the tensile layer interposed between each pair of adjacent courses may extend upwards over the upper, rather than the lower, course of core elements or blocks. Alternatively, as shown in FIG. 4, the tensile layer may extend upwardly against the existing vertical wall surface, and downwardly over the external face of the course of core elements immediately below. Thus referring to FIG. 4, the bottom course 12A of core elements has a tensile layer 13A which passes across the upper surface of the bottom course 12A and then upwardly against an existing vertical wall surface S, the tensile layer 13A passing downwardly over the outer surface of the bottom course 12A and being bonded thereto as before. The next successive course 12B is bonded to the upwardly extending portion of a previously applied tensile layer 12A and then a further tensile layer 13B is applied to the upper surface of the second course 12B. Each layer 13A, 13B of tensile material extends vertically, on each side of the respective courses, over a height substantially equal to the height of two courses.

We claim:

1. A board for use in reinforced synthetic resin constructions comprising: a plurality of core strips arranged in closely spaced side by side relation with facing edge surfaces of complementary shape; fibrous reinforcement material interposed between said facing edge surfaces of the strips and lying flat against the outer faces of the board, and adhesive attaching said fibrous material to the core strips at spaced apart locations to form a unitary board; the board being in an unprocessed state in which it has yet to be transformed from a relatively weak structure into a relatively strong, rigid structure by the curing of resin impregnated into said fibrous material.

2. The reinforcement board defined in claim 1 wherein the fibrous reinforcement material is provided in the form of a plurality of material lengths each of which extends around one said facing edge surface of an associated said core strip to lie flat against the two outer faces of at least that core strip.

3. The reinforcement board defined in claim 2, wherein the said material lengths associated with adjacent core strips overlap each other.

4. The reinforcement board defined in claim 2, including at least one continuous outer sheet of fibrous reinforcement material covering the said material lengths on at least one face of the board and retained against the core strips by the said adhesive.

5. The reinforcement board defined in claim 1, wherein the facing edge surfaces of adjacent core strips comprise a rounded edge of convex cross section on one strip cooperating with a rounded edge of complementary concave cross section on the adjoining strip, the said adhesive attaching the fibrous material to the core strips being resin soluble.

6. The reinforcement board defined in claim 1 or claim 5, including resin flow channels between the core strips, defined by transverse grooves in at least one of each pair of facing edge surfaces.

7. The reinforcement board defined in claim 1, wherein each core strip is made from a rigid low-density urethane foam.

8. The reinforcement board defined in claim 7, wherein each core strip is moulded with a skin layer of higher density than the remainder of the core strip.

9. A conformable board for use in reinforced synthetic resin constructions, comprising:
   a plurality of core strips arranged in closely spaced side by side relation with facing edge surfaces of adjacent core strips being of complementary convex and concave shape;
   fibrous reinforcement material interposed between said facing edge surfaces of the strips and lying against both outer faces of the board; and
   means for attaching said fibrous reinforcement material to the core strips to form a unitary board, said means being such as to permit bending of the board at least when wetted out with resin;
   the board being in a dry, unprocessed state in which it has yet to be transformed from a relatively weak structure into a relatively strong, rigid, structure by being wetted out with resin which is then allowed to cure.

10. The board defined in claim 9, wherein said means attaching the fibrous reinforcement material to the core strips comprise parallel rows of stitching, each row extending in the longitudinal direction of the core strips and relative to which the fibrous reinforcement material can slide.

11. The board defined in claim 9, wherein said means attaching the fibrous reinforcement material to the core strips comprise resin-soluble adhesive.

* * * * *